May 31, 1949.  J. A. SHAW  2,471,550
TREATMENT OF COKE OVEN GAS
Filed March 9, 1948
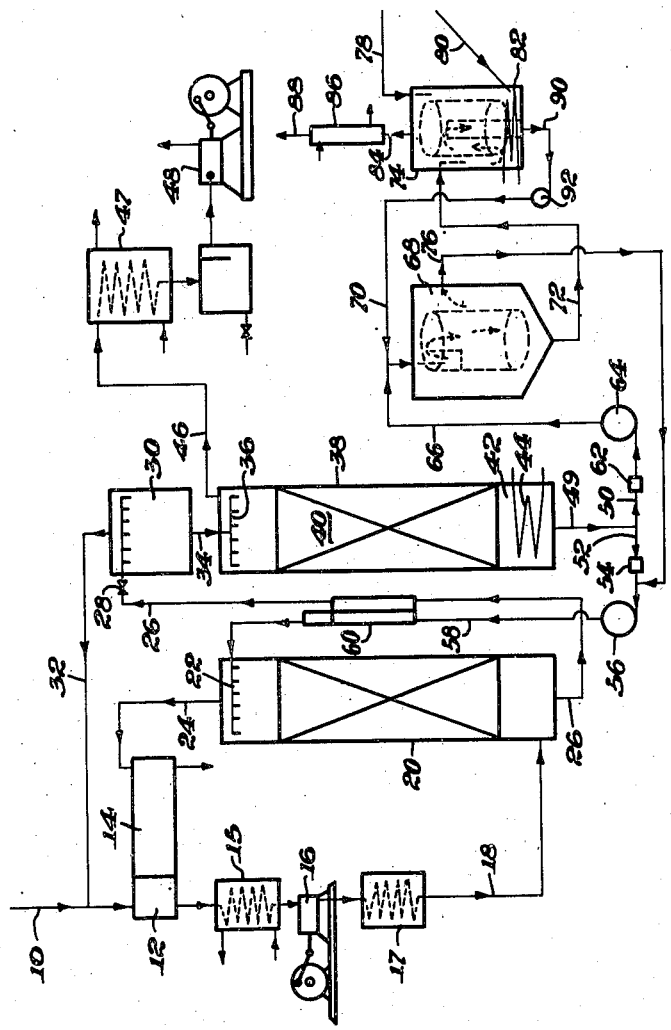
INVENTOR.
JOSEPH A. SHAW
BY
ATTORNEY Patented May 31, 1949

2,471,550

UNITED STATES PATENT OFFICE 2,471,550

TREATMENT OF COKE-OVEN GAS

Joseph A. Shaw, Pittsburgh, Pa., assignor to Koppers Company, Inc., Pittsburgh, Pa., a corporation of Delaware Application March 9, 1948, Serial No. 13,881
In Great Britain July 10, 1946

17 Claims. (Cl. 260—677)

This invention relates to the treatment of coke oven gas. More particularly the invention relates to the recovery of olefines from coke oven gas.

The gas produced in the byproduct coke oven contains a substantial amount of the olefines, ethylene and propylene. It has been found that the most coke oven gases containing these olefines also contain small amounts of acetylene. Silver nitrate has been found to be an absorbent for the olefines, but the silver nitrate reacts chemically with acetylene to form silver carbide ($Ag_2C_2.AgNO_3$) which is highly explosive. This hazard has prevented the use of silver nitrate as an absorbent for the olefines.

Silver nitrate in dilute solutions (2% to 10%) is not efficient as an absorbent for olefines because such large volumes of silver nitrate solution are required. Coke oven gas, particularly if it contains hydrogen, acts to precipitate metallic silver from silver nitrate solution when the olefines are being absorbed. As the concentration of the silver nitrate solution increases the precipitation of the metallic silver increases. This action causes loss of silver and further has prevented the use of silver nitrate as an absorbent for the olefines.

I have found that a strong solution of silver nitrate (about 31% silver nitrate or approximately one-half saturation) is an efficient absorbent solution for ethylene and propylene. Further I have found that if sufficient iron salt solution is added to the silver nitrate solution metallic silver will not separate when the coke oven gas is passed through such a mixture. I have also found that when the acetylene reacts with a strong silver nitrate solution a new silver acetylide compound is formed ($Ag_2C_2.6AgNO_3$). This new silver acetylide compound is not explosive, or at least only mildly so.

The olefines absorbed by a silver nitrate-ferric nitrate solution may be readily separated from the solution by distillation and the silver acetylide may be precipitated from the solution with mercuric nitrate. The mercury-silver acetylide may be readily decomposed by heat and oxidation to separate the acetylene therefrom and revivify the mercuric nitrate.

The primary object of the present invention is to provide a method of safely separating olefines from coke oven gas.

Another object of the invention is to provide a process of separating olefines from gas with a silver nitrate solution without the formation of an explosive silver salt.

A further object of the invention is to provide a process by which silver nitrate solution may be used for separating olefines from gas without the separation of metallic silver from the absorbing solution.

A further object of the invention is to provide a process by which olefines and acetylene may be simultaneously separated from gas and thereafter easily separating the olefines from the acetylene.

Another object of the invention is to provide a method of chemical separation of silver acetylide from a silver nitrate solution whereby the silver nitrate solution may be refused for absorption without contamination of precipitating materials.

A still further object of the invention is to provide a process by which olefines may be continuously absorbed in a silver nitrate solution which is continuously cycled between an absorption zone and a revivification zone.

With these and other objects in view the invention consists in the process of separating olefines from gas which is hereinafter described and particularly defined in the claims.

In the accompanying drawing is diagrammatically illustrated in a flow sheet form, an apparatus in which the preferred form of the invention may be carried out.

The preferred form of the invention is concerned principally with the treatment of coke oven gas which usually contains olefines, that is principally ethylene and propylene, and a small amount of acetylene. Such a gas is introduced through a line 10 into a compressor 12 that forms an integral part of a turbine compressor unit 14. The gas passes from the compressor 12 through a cooler 15 into a second stage compressor 16 which preferably is steam or power driven. The gas leaving the compressor 16 is preferably under a pressure of about 150 lbs. and passes through a cooler 17 and line 18 into the base of an absorption tower 20. The gas passes upwardly through the filling in the tower 20 countercurrent to a stream of absorption solution which is introduced into the top of the tower 20 through a distributor 22. The absorption solution consists of a strong silver nitrate solution having ferric nitrate and free nitric acid therein. The unabsorbed gas passing through the tower 20 leaves through a line 24 and flows into the turbine 14 wherein the pressure of the gas is reduced to substantially atmospheric pressure in operating the compressor. The gas leaving the compressor has its olefine and acetylene content removed therefrom and is suitable for use as a combustion fuel.

In commercial practice it has been found that the ethylene content of a coke oven gas varies from 2% to 3%, the propylene content varies from 0.4% to 1% and the acetylene content varies from 0.05% to 0.1%. With such a gas it is found that 385 gallons of a 31% silver nitrate solution is required for each 1000 cubic ft. of gas treated. This silver nitrate solution preferably is composed of 31% by weight of silver nitrate-water solution mixed with a 3.2% ferric nitrate solution which comprises 10% by weight of ferric nitrate based on the weight of the silver nitrate in the solution. Furthermore the solution contains a small amount (from zero to 11%) of free nitric acid. This acid condition therefore requires the use of acid-resistant equipment for handling the solutions.

With some types of gas which contain substantial amounts of hydrogen it has been found that a 25% to a 35% silver nitrate solution will give satisfactory absorption.

The rich silver nitrate solution which reaches the bottom of the absorbing zone passes out of the absorber 20 through a line 26 through a pressure release valve 28 into an expansion chamber 30. In the expansion chamber coke oven gases containing some olefines are released and these gases pass through a line 32 which connects with the line 10 to be returned to the compressor 12. The silver nitrate solution upon which the pressure has been reduced flows from the chamber 30, through a line 34 into a distributor 36 which is located in the top of a still or stripper 38. The rich silver nitrate solution flows down through a filling 40 in the stripper and enters a heating chamber 42 which is heated by a steam coil 44. The heat acts to distill off the olefines absorbed in the silver nitrate solution, the olefine vapors being removed from the stripper 38 through a line 46 which is connected with a condenser 47 and a vacuum pump 48. Preferably the vacuum pump maintains a vacuum of about four and a half inches of mercury in the stripper.

The lean silver nitrate solution which also contains silver acetylide complex leaves the bottom of the stripper 38 through a line 49 where the stream is divided, a minor portion passing through a line 50, and a major portion passing through a line 52 through a check valve 54 to a pump 56. The pump acts to increase the pressure of the solution to a pressure slightly above 150 lbs. and forces the solution through a line 58 and heat interchanger 60 to the distributor 22. The cooling of the silver nitrate solution in the exchanger 60 is effected by exchange of heat from the solution leaving the bottom of the absorbing tower 20 through the line 26 which passes through the exchanger 60. The silver nitrate solution flowing through the line 52 into the absorbing tower constitutes a major portion and under some conditions from 90% to 98% of the lean solution leaving the bottom of the absorber 20. Therefore a small amount of the silver carbide is recycled through the absorbing zone. The minor portion of the lean silver nitrate solution having silver carbide therein flows through the line 50 and a check valve 62 to a pump 64 which forces the solution through a line 66 into a precipitating and settling tank 68. The silver nitrate solution flowing through the line 66 constitutes the minor portion or sometimes 2% to 10% of the lean solution leaving the distillation zone and is regulated to withdraw from the volume of lean solution being treated a sufficient amount of silver nitrate solution having silver carbide therein to carry into the precipitating zone an amount of acetylene usually slightly greater than that which has been absorbed from the gas in the silver nitrate solution in the absorber 20 in one pass. The silver nitrate solution entering the precipitating chamber through the line 66 is mixed with a solution of mercuric nitrate and free nitric acid introduced through a line 70. The amount of mercuric nitrate entering through the line 70 is slightly less than is required to precipitate the silver carbide in the silver nitrate solution entering through the line 66 but usually sufficient to precipitate acetylene equivalent to that absorbed in one pass through the absorber. The reaction between the mercuric nitrate and the silver carbide forms a mercury acetylide ($HgC_2.3AgNO_3$) which precipitates. This compound is not an explosive compound. The mercury acetylide settles slowly through the precipitator 68 to separate from silver nitrate which enters through the line 66. The mercury acetylide leaves the bottom of the precipitator 68 through a line 72 and flows into the top of a heater 74. The silver nitrate solution which is settled to be free of mercury salt leaves the top of the precipitator through a line 76 by which it is passed back to the pump 56 to be circulated into the top of the absorber 20.

In the top of heater 74 a line 78 is provided through which adventitious losses of solution may be compensated. These will be principally water and nitric acid. Air is introduced in controlled quantity near the bottom of heater 74 through line 80. The purpose of the air is to convert nitric oxide, formed by decomposition of the mercury acetylide and nitric acid, to nitrogen dioxide which will upon meeting condensed water vapor in reflux condenser 86 form nitrous and nitric acid solutions which will flow back into the heater 74 and be made available for destruction of more acetylide. The mercury acetylide solution, which incidentally contains some silver nitrate, is furthermore heated by a steam coil 82. The heat and oxidation of the mercury acetylide decomposes the salt to set free gas which flows out through a line 84 through a reflux condenser 86 and exhausts from the condenser through a line 88. The heating and oxidation reaction decomposes the acetylene complex and reforms mercuric nitrate. The air reacts with the nitric acid to form nitric oxide which, in turn, is reduced to nitrous oxide. The nitrous oxide is absorbed by water present to form nitrous and nitric acids which remain in the heating zone. This mixture of mercury nitrate, free nitric and nitrous acids, and some silver nitrate flows out of the bottom of the heater through a line 90 to a pump 92 which forces the solution through the line 70 to the precipitating tank 68.

While the only postulated chemical losses in this process are excess air and decomposed acetylene there are bound to be certain unavoidable losses at various points. These losses can suitably be compensated by additions of reagents through line 78.

It will be noted that the described arrangements permit the mercury salts to be circulated in only one part of the system which does not include the two filled towers. The obvious advantage of this procedure is to render unnecessary the handling of a solution in the absorber and actifier that contains solids, which might cause stoppages. Attention is also called to the fact that while there is never more than enough mercury salt in precipitating tank 68 to unite with the acetylene, there is a large quantity of mercury salt in the heater 74. A large volume of mercury salt in excess of the molar quantity required to decompose the mercury-acetylene compound greatly facilitates a rapid destruction of the acetylide.

An important feature of the present invention resides in the control of the strength of the silver nitrate solution used for absorption. If the absorption solution contains less than about 10% of silver nitrate, removal of acetylene from the gas will be incomplete, the acetylide formed will be only sparingly soluble in the solution and will settle out as crystals of $Ag_2C_2 \cdot AgNO_3$ with the crystal habit of needles or crosses or both. This compound is very highly explosive. As the strength of the silver nitrate solution increases, removal efficiency of acetylene from the gas increases markedly and much more acetylene is soluble in a given volume of solution. Normally such a volume of $AgNO_3$ solution is used for the absorption of the olefines as will contain all of the so absorbed acetylene in a soluble condition.

If acetylene is absorbed beyond the saturation point in a strong silver nitrate solution it is precipitated in the form of relatively large rhombohedral crystals having the formula $Ag_2C_2 \cdot 6AgNO_3$. These crystals are substantially non-explosive. Commercially this will distinctly contribute to the margin of safety. If the silver nitrate solution is above 25% concentration no salt containing one mol of silver nitrate is formed at the acetylene saturation point.

As the concentration of silver nitrate in the absorption solution increases, the ability of the solution to absorb both olefines and acetylene increases. However, as the silver nitrate concentration in the absorption solution increases, the ability of the hydrogen in the gas to precipitate metallic silver from the silver nitrate increases. Further an increase in the nitric acid content of the absorption solution tends to decrease the ability of the solution to hold the silver acetylide in solution. Taking all of these factors into consideration it has been found that an absorption solution of approximately the following composition is desirable, safe and efficient for commercial use.

|  | Per cent |
|---|---|
| $AgNO_3$ | 31 |
| $HNO_3$ | 11 |
| $Fe(NO_3)_3$ | 3.2 |
| Water | 54.8 |

Ordinarily coke oven gas contains approximately 50% of hydrogen so that this gas has a strong reducing effect on silver nitrate. I have found that the above-mentioned absorbing solution which contains 31% of silver nitrate, 11% free nitric acid, and 3.2% of ferric nitrate is sufficient to prevent the silver from precipitating even when the hydrogen content of the gas being treated is composed of 80 to 90% hydrogen. If there is no hydrogen present in the gas, then ferric nitrate is not required. The main function of the ferric nitrate is to prevent the formation of metallic silver in this solution.

Depending upon the amount of acetylene in the gas and the strength of the silver nitrate solution the ferric nitrate may vary from 5% to 15% by weight of the silver nitrate in the solution. Thus the ferric nitrate will vary from 1% to 5% by weight of the absorption solution. The amount of ferric nitrate present in the absorption solution is directly dependent upon the strength of the silver nitrate solution and therefore the strength of the ferric nitrate solution is preferably referred to as percent by weight of the silver nitrate in the absorption solution.

When working with gases containing a substantial amount of hydrogen (from 20% to 50%) the amount of nitric acid may be varied from 7% to 13% by weight of an absorption solution containing from 25% to 35% of silver nitrate. The nitric acid assists the ferric nitrate in preventing formation of metallic silver in the absorption system and is necessary for the decomposition of the mercury acetylide complex in the heater 74.

A strong silver nitrate solution containing from 20% to 35% silver nitrate by weight has an active absorption value for acetylene while a silver nitrate solution of 5% to 15% by weight is not very effective for absorbing acetylene. A strong silver nitrate solution prevents the formation of explosive silver acetylide and, therefore, such a strong solution must be maintained in the absorber. By using an excess volume of strong silver nitrate solution in continuous circulation in the absorber, the concentration of the silver nitrate solution during absorption may readily be maintained between 25% and 35% $AgNO_3$ by weight.

This application is a continuation-in-part of my application Serial No. 637,740 filed December 28, 1945, for "Treatment of coke oven gas," now abandoned.

The preferred form of the invention having been thus described, what is claimed as new is:

1. A process of separating olefines from gas containing hydrogen and small amounts of olefines and acetylene comprising: separating the olefines and acetylene from other constituents of the gas by selectively absorbing the olefines and acetylene in an aqueous solution of silver nitrate containing 25 to 35 percent by weight of silver nitrate, and maintaining in the solution free nitric acid and from 5 to 15 percent by weight of ferric nitrate based on the weight of silver nitrate in the solution to keep a silver acetylide complex formed by the absorption of acetylene dissolved in the silver nitrate absorbent and to prevent the precipitation of silver.

2. A process of separating olefines from gas containing hydrogen and small amounts of olefines and acetylene comprising: separating the olefines and acetylene from other constituents of the gas by selectively absorbing the olefines and acetylene in an aqueous solution of silver nitrate containing 25 to 35% by weight of silver nitrate, and maintaining in the solution from 7 to 13% by weight of free nitric acid and from 5 to 15% by weight of ferric nitrate based on the weight of silver nitrate in the solution to keep a silver acetylide complex formed by the absorption of acetylene dissolved in the silver nitrate absorbent and to prevent the precipitation of silver.

3. The process defined in claim 1 in which the olefines are separated from the silver nitrate absorbent by distilling under vacuum.

4. The process defined in claim 1 in which olefines are separated from the absorbing solution by distillation and thereafter the absorbed acetylene compounds are precipitated from the absorbing solution with mercuric nitrate to recover silver nitrate solution.

5. The process defined in claim 1 in which the olefines are separated from the absorbing solution by distillation, thereafter the absorbed acetylene compounds are precipitated from the solution with mercuric nitrate and the regenerated silver nitrate solutions from which the olefines and acetylene have been separated are recycled back to the absorption zone in a continuous process.

6. The process defined in claim 1 in which the olefines are separated from the absorbing solution by distillation, the absorbed acetylene compounds are precipitated from the absorbing solution with mercuric nitrate and the regenerated silver nitrate solutions from the distillation and precipitation zones are recycled back to the absorption zone in a continuous process, the precipitation of the acetylene compounds being carried out after the olefines have been separated from the absorption solution.

7. The process defined in claim 1 in which the olefines are separated from the absorbing solution by distillation, the absorbed acetylene compounds are precipitated from the absorbing solution with mercuric nitrate and the regenerated silver nitrate solutions from the distillation and precipitation zones are recycled back to the absorption zone in a continuous process, the precipitation of the acetylene compounds being carried out after the olefines have been separated from the absorption solution by treating a minor portion of the absorption solution in the precipitation zone.

8. The process of recovering olefines from coke oven gas which contains acetylene comprising: passing the gas through a strong silver nitrate solution held under a superatmospheric pressure to absorb olefines and acetylene, distilling the rich absorption solution under reduced pressure to separate olefines while retaining the acetylene in the absorbent, recycling a major portion of the distilled absorption solution back to the absorption zone, passing the remaining distilled absorption solution into a precipitation zone and treating it with mercuric nitrate to precipitate the acetylene compounds and returning the silver nitrate from the precipitation zone back to the absorption zone.

9. A process of recovering olefines from coke oven gas which contains acetylene comprising: passing the gas through a strong silver nitrate solution held under superatmospheric pressure to absorb olefines and acetylene, distilling the rich absorption solution under reduced pressure to separate olefines while retaining the acetylene in the absorbent, recycling a major portion of the distilled absorption solution back to the absorption zone, passing the remaining distilled absorption solution into a precipitation zone and treating it with a quantity of mercuric nitrate slightly less than is required to precipitate all of the acetylene compounds in the solution and returning the silver nitrate from the precipitation zone back to the absorption zone.

10. The process defined in claim 5 in which the amount of absorption solution sent to the precipitation zone will provide slightly more acetylene compound than will be precipitated by the mercuric nitrate supplied to the precipitation zone, the amount of mercuric nitrate being such as to precipitate an amount of acetylene compounds equal to the acetylene compounds being produced in the absorption zone, thus insuring the absence of mercury salts in solution going to the absorber where they would precipitate solid mercury-acetylene complex and clog the absorber.

11. A process of recovering olefines from coke oven gas containing a small amount of olefines and acetylene comprising: passing the gas through a strong silver nitrate solution held under superatmospheric pressure to absorb olefines and acetylene while permitting the remainder of the gas to pass through the solution, distilling the rich absorption solution under reduced pressure to separate olefines while retaining acetylene compounds in the absorbent, recycling a major portion of the distilled absorption solution back to the absorption zone, passing the remaining distilled absorption solution into a precipitation zone and treating it with a quantity of mercuric nitrate slightly less than is required to precipitate all of the acetylene compounds in the solution, returning silver nitrate from the precipitation zone to the absorption zone and heating and oxidizing the precipitated mercury acetylene compound to decompose the compound and revivify mercuric nitrate.

12. The process defined in claim 11 in which a volume of mercury nitrate in excess of the molar equivalent volume which is required for decomposition of the mercury acetylene compound is maintained in the heating zone to insure rapid decomposition of the compound.

13. A process of recovering olefines from a gas which contains hydrogen with a small amount of olefines and acetylene comprising: passing the gas through a strong silver nitrate solution held under superatmospheric pressure to absorb only olefines and acetylene, distilling the rich absorption solution under reduced pressure to separate olefines while retaining acetylene compounds in the absorbent, recycling a major portion of the distilled absorption solution back to the absorption zone, passing the remaining distilled absorption solution into a precipitation zone and treating it with a quantity of mercuric nitrate slightly less than is required to precipitate all of the silver-acetylene compounds in the solution, returning silver nitrate from the precipitation zone to the absorption zone, heating and oxidizing the precipitated mercury-acetylene compounds to decompose the compounds and revivify mercuric nitrate, and returning the mercury nitrate to the precipitation zone.

14. The process defined in claim 9 in which all of the mercury compound precipitated therein together with some silver nitrate is removed from the precipitation zone and separately treated with air and nitric acid to decompose the mercury compound and regenerate mercuric nitrate, and returning the regenerated mercuric nitrate with silver nitrate back to the precipitation zone.

15. The process defined in claim 1 in which the olefine is absorbed in a 31% silver nitrate solution under a pressure of 150 lbs. and the rich absorption solution is distilled under a vacuum to separate olefines therefrom.

16. A process of recovering olefines from a coke oven gas which contains acetylene comprising: passing the gas through a strong silver nitrate solution to absorb essentially only olefines and acetylene, distilling the rich absorption solution to separate olefines while retaining acetylene compounds in the absorbent, recycling a portion of the distilled absorption solution back to the absorption zone, passing the remaining distilled absorption solution into a precipitation zone and treating it with a quantity of mercuric nitrate containing free nitric acid which is less than is required to precipitate all of the silver acetylene compounds in the solution, returning silver nitrate with unprecipitated silver acetylene therein from the precipitation zone to the absorption zone, heating and oxidizing the precipitated mercury-acetylene compounds to decompose the compounds and to revivify the mercuric nitrate and nitric acid, and returning mercuric nitrate solution with nitric acid to the precipitation zone.

17. A process of recovering olefines from a coke oven gas which contains acetylene comprising: passing the gas through a strong silver nitrate solution to absorb olefines and acetylene, distilling the rich absorption solution to separate olefines while retaining acetylene compounds in the absorbent, recycling a portion of the distilled absorption solution back to the absorption zone, passing the remaining distilled absorption solution into a precipitation zone and treating it with a quantity of mercuric nitrate containing free nitric acid less than is required to precipitate all of the silver-acetylene compounds in the solution, returning silver nitrate with unprecipitated silver-acetylene compounds therein from the precipitation zone to the absorption zone, oxidizing the precipitated mercury acetylene compounds and nitric acid with air while heating to decompose the compounds and revivify the mercuric nitrate and to form nitric and nitrous acids, and returning the mercuric nitrate with the nitric and nitrous acids to the precipitation zone.

JOSEPH A. SHAW.

No references cited.